United States Patent [19]

Gautier et al.

[11] Patent Number: 5,249,504

[45] Date of Patent: Oct. 5, 1993

[54] PNEUMATIC BOOSTER

[75] Inventors: Jean-Pierre Gautier; Ulysse Verbo, both of Aulnay-Sous-Bois; Miguel Perez, Argenteuil, all of France

[73] Assignee: Bendix Europe Services Techniques, Drancy, France

[21] Appl. No.: 878,279

[22] Filed: May 4, 1992

[30] Foreign Application Priority Data

May 14, 1991 [FR] France .................. 91 05842

[51] Int. Cl.[5] ............................ F15B 9/10
[52] U.S. Cl. ................. 91/376 R; 91/369.2; 91/369.3; 91/369.4
[58] Field of Search ............ 91/369.1, 369.2, 369.3, 91/369.4, 376 R; 60/547.1

[56] References Cited

U.S. PATENT DOCUMENTS

| | | | |
|---|---|---|---|
| 4,757,749 | 7/1988 | Gautier | 91/369.2 |
| 4,765,226 | 8/1988 | Bequet et al. | 91/369.1 |
| 4,777,865 | 10/1988 | Gautier | 91/369.2 |
| 4,995,302 | 2/1991 | Suzuki et al. | 91/369.3 |
| 5,029,515 | 7/1991 | Endo | 91/369.1 |

FOREIGN PATENT DOCUMENTS 0218510  4/1987  European Pat. Off. .
0242269  10/1987  European Pat. Off. .

Primary Examiner—Edward K. Look
Assistant Examiner—Todd Mattingly
Attorney, Agent, or Firm—Larry J. Palguta; Ken C. Decker

[57] ABSTRACT

The invention relates to a pneumatic brake-booster comprising a casing (10), inside which is situated a piston (22) consisting of a rear tubular part (22) which supports a skirt (14) and which with the aid of an unwinding diaphragm (12) defines a front chamber (16) permanently connected to a vacuum source and a rear chamber (18) selectively connected to the front chamber (16) or to the atmosphere by a valve mechanism (20a, 32a, 40) actuated by a control rod (34) adapted to bear, by way of a plunger (32) sliding in a bore (30) of the piston (20), against one face of a reaction disk (58) fastened to a push rod (56), the valve mechanism (20a, 32a, 40) comprising a valve closure member (40) cooperating with a first valve seat (32a) formed on the plunger (32) and with a second valve seat (20a) formed on the piston (20), a retaining member (50), for the plunger (32) disposed in a radial space (38) in the piston (20) and having an inner end region extending the bore (30) of the piston (20) and forming a stop surface cooperating with axial abutment with a shoulder (74) on the plunger (32). According to the invention, the stop member (50) is permanently urged towards the rear by a resilient mechanism (66) to act in the closing direction on a second valve mechanism (64, 78).

9 Claims, 1 Drawing Sheet

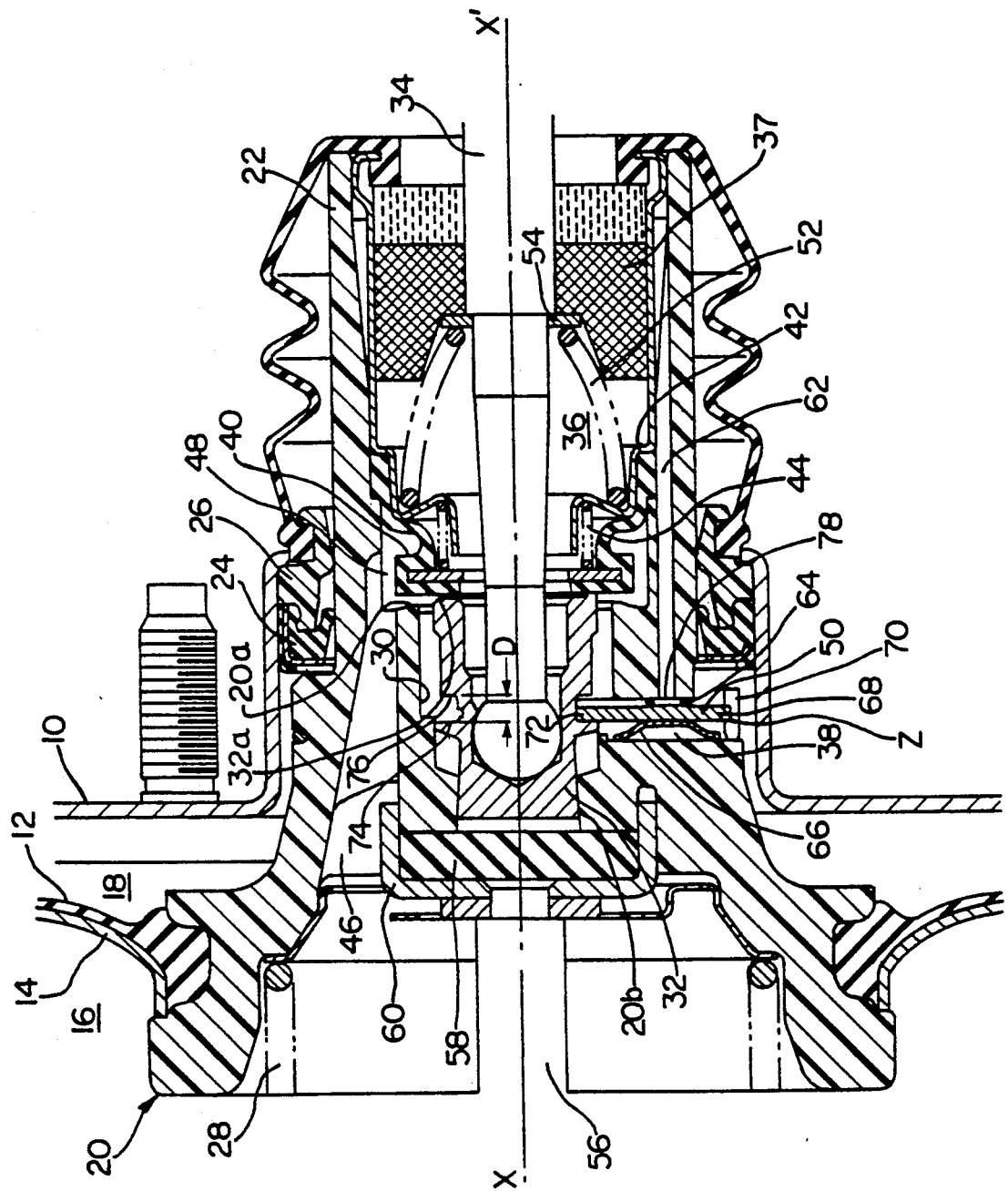

PNEUMATIC BOOSTER

The present invention relates to pneumatic boosters, more particularly those of the type used to provide braking assistance in motor vehicles.

Conventionally, boosters of this type comprise a piston which consists of a rear tubular part and a skirt and which with the aid of an unwinding diaphragm defines a front chamber permanently connected to a vacuum source and a rear chamber selectively connected to the front chamber or to the atmosphere by a valve means actuated by a control rod adapted to bear, by means of a plunger sliding in a piston bore, against one face of a reaction disk fastened to a push rod, the valve means comprising a valve closure member cooperating with a first valve seat formed on the plunger and with a second valve seat formed on the piston, a plunger retaining member disposed in a radial space in the piston and having an inner end zone extending in the piston bore and forming a stop surface cooperating by axial abutment with a shoulder on the plunger.

Although their operation is satisfactory, boosters of this kind nevertheless have some disadvantages. Thus, during braking, the passage offered to atmospheric air towards the rear chamber is reduced, which slows down the movement of the air in the direction of the rear chamber and increases the response time of the booster. Various compromises have been proposed to make this response time acceptable for so-called "normal" braking when only the slowing down of the vehicle is desired. However, this response time is always much too long in the case of heavy braking for which rapid intervention of the booster is desired.

The present invention consequently has the object of providing a booster whose response time is as short as possible in the event of heavy braking. To this end the subject of the invention is a booster in which additional air passages between the atmosphere and the rear chamber are opened in the event of heavy braking.

According to the present invention the retaining member is permanently urged towards the rear by a resilient means in order to urge a second valve means in the closing direction.

The invention will now be described by way of example with reference to the accompanying drawings, in which:

The single figure is a side view in longitudinal section, showing the central part of a pneumatic brake-booster constructed in accordance with the present invention.

The figure shows a part of a brake-booster intended to be installed in the usual way between the brake pedal of a vehicle and the master cylinder controlling the hydraulic brake circuit of the vehicle. By convention the part of the booster turned towards the master cylinder will be called the front, and the part turned towards the brake pedal will be called the rear.

The booster shown in the figure comprises an outer shell-shaped casing 10 possessing symmetry of revolution about an axis X—X'. Only the rear central part of said casing 10 is shown in the figure.

An unwinding flexible diaphragm 12 made of elastomer material, reinforced in its central part by a metal support disk or skirt 14, defines inside the space bounded by the casing 10 a front chamber 16 and a rear chamber 18. The outer peripheral edge (not shown) of said diaphragm 12 is sealingly fastened on said outer casing 10. The inner peripheral edge of said diaphragm terminates in a bead held sealingly in an annular groove formed in the outer peripheral surface of a hollow booster piston 20 disposed along the axis X—X' of the booster. Said hollow piston 20 is extended towards the rear in the form of a tubular portion 22 passing sealingly through the rear wall of said casing 10. Leaktightness at this point is achieved with the aid of a reinforced annular seal 24, which is fastened by a ring 26 in a tubular central part forming a rearward extension of the rear wall of said casing 10.

A compression spring 28 interposed between said piston 20 and the front wall (not shown) of said outer casing 10 normally holds said piston 20 and said skirt 14 in a rear position of rest, which is shown in the figure and in which said rear chamber 18 has its minimum volume and said front chamber 16 its maximum volume.

In its central part situated between said rear tubular portion 22 and the front portion in which said diaphragm 12 and said skirt 14 are fastened, said piston 20 has a bore 30 in which is slidingly received a plunger 32 likewise possessing symmetry of revolution about the axis X—X'. The front end of a booster control rod 34, likewise disposed along the axis X—X', is mounted ball-jointedly in said plunger 32. The rear end (not shown) of said rod 34, which projects outside said tubular portion 22 of said piston 20, is controlled directly by the brake pedal (not shown) of the vehicle.

The annular space 36 delimited between said control rod 34 and the tubular portion of said piston 20 leads out to the atmosphere at the rear of the booster, for example by way of an air filter 37. Towards the front, this same annular space can communicate with said rear chamber 18 through a radial passage 38 formed in the central part of the piston when assistance means controlled by said plunger 32 are actuated.

In a conventional manner, said assistance means comprise a three-way valve consisting of an annular valve closure member 40 mounted in the tubular portion of the piston and two annular valve seats 20a and 32a formed respectively on the central portion of said piston 20 and on said plunger 32.

Said valve closure member 40 forms the front end, of smaller diameter, of a flexible elastomer sleeve whose rear end terminates in a bead mounted sealingly inside said tubular portion 22 of said piston 20. Said bead is held in place by a metal cup 42, against which bears a compression spring 44 urging said valve closure member 40 in the forward direction.

Said annular valve seat 32a is formed on the rear end face of said plunger 32. In a comparable manner, said annular valve seat 20a is formed on the rear end face of the central portion of said piston 20, around said seat 32a. Depending on the position of said plunger 32 inside said piston 20, this arrangement enables said valve closure member 40 always to bear sealingly against at least one of said valve seats 32a and 20a through the action of said spring 44.

A second passage 46 is formed in the central portion of said piston 20, approximately parallel to the axis X—X' of the latter, in order to bring said front chamber 16 of the booster into communication with an annular chamber 48 formed around said valve closure member 40, inside said tubular portion 22 of said piston 20. When said plunger 32 occupies its rear position of rest which is shown in the figure, and in which said valve closure member 40 bears sealingly against said seat 32a of said plunger 32 and is at a distance from said seat 20a of said piston 20, said front chamber 16 and said rear chamber 18 of the booster are thus in communication with one another by way of said passage 46, said annular chamber 48 and said passage 38.

Likewise in a conventional manner, at least one stop member or stopping key 50 mounted in a radial space the central portion of said piston 20 delimits the rearward axial stroke of said plunger 32 inside the latter. Said plunger 32 is normally held in the rear position of rest, defined by said member 50, by means of a compression spring 52 interposed between the cup 42 and a washer 54, which in turn bears against a shoulder formed on said control rod 34.

In its central portion said piston 20 comprises an annular front face 20b, onto the center of which said bore 30 leads out. Said annular front face 20b of said piston 20 acts on a rear face of a push rod 56 through a reaction disk 58 of a deformable material, such as an elastomer. More precisely, said push rod 56 and said reaction disk 58 are disposed along the axis X—X' of the booster, in line with said control rod 34 and said plunger 32. Said reaction disk 58 is capped by a hood 60 fastened to said push rod 56 and centered on the axis X—X' of the booster, said hood cooperating with an annular groove formed in the central portion of said piston 20, around the annular front face 20b of the latter.

The operation of this known booster is conventional and may be briefly described as follows.

When the booster is installed in a vehicle, the front chamber 16 is in permanent communication with a vacuum source.

In a first stage, the force applied by the driver to the brake pedal has the effect of equaling the prestress force of the spring 52 minus the prestress force of the spring 44. In the course of the following slight movement of the control rod 34 and plunger 32 the valve closure member 40, acted on by said spring 44, follows the seat 32a of the plunger 32 until it comes into contact with the seat 20a of the piston; the front chamber 16 and rear chamber 18 of the booster are then isolated from one another.

In a second phase of the operation of the brake, said plunger 32 is moved sufficiently far forwards for said valve closure member 40 to be in sealing contact with said seat 20a of the piston and to start to move away from said seat 32a of the plunger. This being the case, said rear chamber 18 of the booster is isolated from said front chamber 16 and comes into communication with the atmosphere.

The rear chamber 18, which previously was in communication with said front chamber 16 and was therefore under reduced pressure, consequently draws in air at atmospheric pressure through the valve passage of small section between said valve closure member 40 and said plunger seat 32a. There is thus considerable obstruction of the air passage because of the small size of the gap existing in the valve passage 32a-40, and thus a long response time which, although scarcely felt in the case of braking when it is only desired to slow down the vehicle, may become prohibitive for heavy or vigorous braking.

It will therefore be understood that it is highly desirable to provide a booster in which, with an action on said control rod 34 corresponding to heavy or vigorous braking, the section provided for the passage of air will be as large as possible in order that the response time may be as short as possible.

This object is achieved with the aid of the invention, of which one example of embodiment is illustrated in the figure.

It can be seen in the figure that according to the present invention an axial passage 62 is formed in the thickness of the rear tubular portion 22 of the piston 20. Said axial passage connects the radial passage 38 formed in the central portion of the piston to the air at atmospheric pressure at the rear of the booster or through the air filter 37. Said axial passage 62 may, as illustrated, have part of its length formed between said rear tubular portion 22 of said piston 20 and the cup 42 which extends rearwards and is stationary relative to said piston 20.

In order that the booster of the invention may operate conventionally when at rest and during normal braking, said passage 62 is closed by a valve closure member 64. In a particularly advantageous manner, as a result of the invention, a said valve closure member 64 is formed directly on the stop member or stopping key 50 serving to define the position of rest of the plunger 32 relative to the piston 20. In order to perform this last-mentioned function the stopping key 50 is urged towards the rear, in the closing direction of said valve closure member 64, by a resilient member 66, such as a leaf spring or cup spring. The stopping key 50, together with the valve closure member 64 and the spring 66 may advantageously be disposed in the radial passage 38 formed in the central portion of the piston, that is to say the radial space holding said stop member 50 is identical to said radial passage 38. In this way, said spring 66 bears against the front wall of said passage 38 and applies said valve closure member 64 against the rear wall of said passage 38 at the point where the axial passage 62 leads out.

Likewise in order to ensure that said stopping key 50 will operate to define the position of rest of said plunger 32, and since the latter is urged towards the rear by the spring 52, at the radially more remote end of said stopping key 50, that is to say the outer end region 68 of said stopping key 50, axial support is provided for said end 68 by means of the curved end of a retainer 70 conventionally used for the radial retention of said stopping key 50. It will for example be possible to provide a slot in the curved end of said retainer 70 to cooperate with said end 68 of said key 50. The stopping key 50, being urged towards the rear by its end cooperating with said plunger 32, that is to say the inner end region 72 of said stopping key 50, and its end 68 being axially retained by the retainer 70, will thus cause the valve closure member 64 to bear against the rear wall of the passage 38.

The operation of the booster which has just been described can easily be deduced from the explanations given above.

In the position of rest shown in the figure, that is to say the position in which the booster is not actuated and in which the front chamber 16 and the rear chamber 18 are under reduced pressure, the piston 20, as well as the skirt 14 and the unwinding diaphragm 12 associated with it, are in the rear position of rest bearing against the reinforced annular seal 24 and the ring 26 by means of a corresponding shoulder.

The control rod 34 and the plunger 32 are urged towards the rear by the spring 52, said plunger 32 bearing against the stop member 50 by means of a shoulder 74 turned towards the rear and supported on the inner end region 72 of the stopping key 50.

The first phase of actuation, in the course of which the front chamber 16 and rear chamber 18 are isolated from one another, is identical with that described above for a conventional booster. The shoulder 74 of the plunger 32 in fact moves away from the end 72 of the key 50, but the valve closure member 64 remains on its seat 78 under the action of the spring 66.

In the second normal brake actuation phase, said rear chamber 18 of the booster is brought into communication with the atmosphere by way of the radial passage 38, the annular space in the bore 30 around said plunger 32, and the valve passage 32a–40. This results in unbalance of the pressures on the two faces of the piston skirt 14, thus giving rise to an assistance force transmitted by the piston 20 to the push rod 56. More exactly, this assistance force is exerted by the front annular face 20b of said piston 20 on the reaction disk 58. The latter transmits a part of the assistance force to said push rod 56 and uses another part of this force to become deformed towards the rear into the space formed between said bore 30 and the front face of said plunger 32. This deformation continues until the deformed part of said reaction disk 58 comes into contact with the front face of said plunger 32. In the course of this phase, which corresponds to what is called the jump of the booster, said piston 20 and said plunger 32 move forward together. At the end of this phase, a reaction starts to occur on said plunger 32 and said push rod 34, which causes said plunger 32 to move back relative to said piston 20, thus bringing about the closure of the valve passage 32a–40.

It can thus be seen that for normal braking the booster of the invention behaves in a conventional manner.

On the other hand, in a phase of heavy brake actuation a sudden force is exerted on the control rod 34. This results in rapid forward movement of said plunger 32 in said bore 30. The first phase of isolation of the front and rear chambers takes place in a conventional manner. The valve passage 32a–40 then opens, allowing air at atmospheric pressure to penetrate into the rear chamber 18 via the annular space in the bore 30 around the plunger 32 and the passage 38. The pressure in the rear chamber therefore increases, thus producing an assistance force on said piston 20. Nevertheless, in view of the suddenness of the actuation, during the increase in pressure in the rear chamber and the increase in the assistance force, said plunger 32 continues to move forward in said piston 20 over a greater distance than it did during normal actuation. This has the consequence that the valve passage 32a–40 is open wider, that is to say it provides a larger passage section for the air than in normal braking, although this is still regarded as insufficient.

According to the invention, a second passage is provided for the air at atmospheric pressure to enable it to reach the rear chamber 18. Since in fact the plunger 32 has penetrated into the piston 20 to a greater extent than in normal braking, said plunger will bring a second shoulder 76, which is turned towards the front, to bear against the inner end region 72 of the stopping key 50.

As this movement continues, said shoulder 76 of said plunger 32 moves forwards said inner end zone 72 of said stopping key 50, which can make no other movement than pivoting about an axis Z at right angles to the direction of the sliding of said plunger 32 in the bore 30 of the piston 20, that is to say at right angles to the axis X—X'. This axis Z is constituted by the point of anchorage of the end 68 of the key 50 on the retainer 70, which in turn is fastened to said piston 20. This pivoting or rotational movement is made against the action of the spring 66.

In this rotational movement of said stopping key 50, and more precisely the forward movement of its inner end region 72 in a movement of rotation about the axis Z, the valve closure member 64 is caused to move away from its seat 78, which consists of the rear face of the radial passage 38 situated around the axial passage 62, and thus opens a second valve means for the air at atmospheric pressure to pass to the rear chamber 18.

It will thus be understood that in this situation of heavy braking the air at atmospheric pressure is admitted into the rear chamber of the booster by way of the valve passage 32a–40, the annular space in the bore 30 around the plunger 32, and the radial passage 38, as well as by way of the axial passage 62, the valve passage 64–78, and the radial passage 38. It can thus be seen that in this case of extreme braking said radial passage 38 is connected to the atmosphere by two sources: the valve passage 32a–40 and the valve passage 64–78. This obviously results in a greater influx of air towards the rear chamber, and therefore a quicker increase in the assistance force, and consequently a shortening in the response time, which was of course the desired object.

During this phase of heavy brake application, the reaction disk 58 was also stressed by the front face 20b of the piston. However, in the course of its rearward deformation it very quickly encountered the front face of the plunger, which had advanced sufficiently to open the valve passage 64–78.

The reaction of the push rod 56 was therefore very quickly transmitted to the control rod 34. When the driver has reached maximum braking force, or the desired force, which he will know by the "feel" of the brake pedal, he will maintain a constant braking force or will relax it, and this will be passed on to the control rod. The reaction disk 58 then tends to resume a position of equilibrium for the force demanded. Since the front annular face 20a of the piston 20 is still supplying the same force because the difference between the pressures on the two faces of the skirt 14 has not changed, said reaction disk 58 will tend to be further deformed in the rearward direction, thus pushing back the plunger 32 in relation to the piston 20.

In this movement, the shoulder 76 of said plunger 32 will allow the inner end region 72 of the stopping key 50 to return in the rearward direction through the action of the spring 66. The additional passage 62 will thus be closed once again and the booster will return to conventional operation.

The relative positions of rest of the plunger 32 and of the piston 20 are defined by the abutment of the stopping key 50 against the shoulder 74. The relative positions of said plunger 32 and said piston 20 in connection with the opening of the second valve means, which consists of the valve closure member 64 and the seat 78, are defined by the abutment of said stopping key 50 against the shoulder 76. It is therefore clear that the axial distance D between said shoulders 74 and 76 of said plunger 32 determines the stroke of the latter in said piston 20 during which the operation of the booster remains conventional and after which the operation of the booster will be modified in accordance with the present invention in order to obtain a shorter response time in dependence on the rapidity or the nature of the action of the driver of the vehicle on the control rod 34.

It will therefore be possible to determine this distance D in accordance with the features which it is desired to provide for a given booster.

It can thus be clearly seen that a booster has been provided whose operation is conventional for normal conditions of use and in which additional air passages are opened when heavy braking occurs, in order to shorten the response time of the booster under these extreme conditions.

The invention is obviously not restricted to the embodiment which has been described by way of example, but is capable of undergoing numerous modifications which will occur to those versed in the art. Thus, for example, a plurality of additional air passages could be distributed over the periphery of the rear tubular portion of the piston.

In addition, the invention can also be applied to boosters in a tandem arrangement or to those having an additional assistance chamber. The response time of the booster could also be shortened for heavy braking by connecting the rear end of the axial passage 62 to a source of air under a pressure higher than atmospheric. In this way, for normal braking when only the passage 32a–40 is open to the rear chamber, the latter is supplied with air at atmospheric pressure in a conventional manner. On the other hand, for heavy braking when one or more passages 62 are also open, the rear chamber will also be supplied with air at a pressure higher than atmospheric, thus achieving quicker filling of said chamber and a correlative shortening of the response time.

We claim:

1. A pneumatic brake-booster, comprising a casing inside which is situated a piston comprising a rear tubular part which supports a skirt and which with a diaphragm defines a front chamber under low pressure and a rear chamber connected selectively to one of said front chamber and atmosphere by first valve means actuated by a control rod adapted to bear, by means of a plunger sliding in a bore of said piston, against one face of a reaction disk adjacent a push rod, said first valve means comprising a first valve closure member cooperating with a first valve seat at said plunger and with a second valve seat at said piston, a stop member for said plunger disposed in a radial space in said piston and having an inner end region extending into said bore of the piston and forming a stop surface cooperating by axial abutment with a first shoulder on said plunger, wherein said stop member is urged permanently rearwardly by resilient means in order to urge second valve means in a closing direction, said second valve means comprising a second valve closure member cooperating with a third valve seat at said piston.

2. The booster according to claim 1, wherein said second valve closure member is formed on said stop member.

3. The booster according to claim 2, wherein said second valve means may be urged in an opening direction by abutment of said inner end region of said stop member against a second shoulder of said plunger.

4. The booster according to claim 3, wherein in an open position said second valve means permits communication between said rear chamber of the booster and the atmosphere.

5. The booster according to claim 4, wherein opening of said second valve means is determined by an axial distance between said first and second shoulders of said plunger.

6. The booster according to claim 5, wherein the opening of said second valve means is effected when said plunger has made, relative to said piston, a stroke whose length is greater than said axial distance between said first and second shoulders of said plunger.

7. The booster according to claim 6, wherein the opening of said second valve means comprises pivoting of said stop member about a pivoting axis located at a right angle to a direction of the sliding of said plunger in said piston.

8. The booster according to claim 7, wherein said pivoting axis of said stop member comprises an anchorage area of an outer end region of said stop member on a part fastened to said piston.

9. The booster according to claim 8, wherein a stroke effecting the opening of said second valve means is made by said plunger when an action corresponding to heavy braking is applied to said control rod.

* * * * *